United States Patent
Cutler

(10) Patent No.: US 7,941,111 B2
(45) Date of Patent: May 10, 2011

(54) METHOD AND SYSTEM FOR DETECTING AN RF SIGNAL

(75) Inventor: Robert T. Cutler, Everett, WA (US)

(73) Assignee: Agilent Technologies, Inc., Santa Clara, CA (US)

( * ) Notice: Subject to any disclaimer, the term of this patent is extended or adjusted under 35 U.S.C. 154(b) by 1243 days.

(21) Appl. No.: 11/344,610

(22) Filed: Jan. 31, 2006

(65) Prior Publication Data

US 2007/0178846 A1    Aug. 2, 2007

(51) Int. Cl.
*H04B 17/02* (2006.01)
(52) U.S. Cl. ...... 455/133; 455/134; 455/135; 455/226.1
(58) Field of Classification Search .................. 455/133, 455/134, 135, 226.1, 67.11
See application file for complete search history.

(56) References Cited

U.S. PATENT DOCUMENTS

| | | | |
|---|---|---|---|
| 5,049,884 A * | 9/1991 | Jaeger et al. | 342/20 |
| 6,301,514 B1 * | 10/2001 | Canada et al. | 700/108 |
| 6,507,308 B1 * | 1/2003 | Ono et al. | 342/20 |
| 6,665,521 B1 * | 12/2003 | Gorday et al. | 455/67.11 |
| 6,861,970 B1 * | 3/2005 | Garland | 342/20 |
| 6,920,455 B1 * | 7/2005 | Weschler | 707/100 |
| 2003/0157914 A1 * | 8/2003 | Li et al. | 455/296 |

* cited by examiner

*Primary Examiner* — Yuwen Pan

(57) ABSTRACT

A number of RF receivers are connected in a network. The network is used to transmit communications, data, or both to and from the RF receivers and to synchronize the RF receivers to a common time. Digitized RF data is time-stamped and stored in memory. A trigger circuit in one or more RF receivers determines whether a trigger criterion or criteria has been met. When a trigger criterion or criteria has been met, some or all of the RF receivers in the network transmit select digitized RF data to a central processing device. The central processing device processes the select digitized data to detect if a signal is present.

7 Claims, 6 Drawing Sheets

METHOD AND SYSTEM FOR DETECTING AN RF SIGNAL

BACKGROUND

RF Signals are used in a variety of applications, such as medical imaging, broadcast radio, and wireless communications. Many of these signals are modulated, in that the magnitude and phase of a signal changes with time. The specific methods used to modulate signals are varied, resulting in signals that differ in terms of bandwidth, duration, duty cycle, and power levels.

It is often desirable to determine if a modulated signal is present, and if so, the location of the signal emitter. For example, the transmission of an RF signal may be detected as part of a criminal investigation, or to detect and locate unauthorized or unintentional transmissions. The modulation format for some signals may be intentionally chosen to minimize the probability of detection by traditional techniques, such as viewing the spectrum with a spectrum analyzer.

Even when a signal is not designed to avoid detection, a signal may not be detected by traditional techniques if the emitter is located some distance away. Signal power decreases with distance, so detection is dependent on the signal-to-noise (SNR) requirements for the signal detection device and the distance to the signal source. Most detection and geolocation techniques require a positive SNR at the detectors. The techniques may also require a continuous signal or a signal that appears on a regular basis. For example, many direction finding systems can only look in one direction at a time. Consequently, the direction finding system will not locate the transmitter when a signal is present and the directional antennas are pointed in the wrong direction.

SUMMARY

In accordance with the invention, a method and system for detecting an RF signal are provided. A number of RF receivers are connected in a network. The network is used to transmit communications, data, or both to and from the RF receivers and to synchronize the RF receivers to a common time. Digitized RF data is time-stamped and stored in memory. A trigger circuit in one or more RF receivers determines whether a trigger criterion or criteria has been met. When a trigger criterion or criteria has been met, some or all of the RF receivers in the network transmit select digitized RF data to a central processing device. The central processing device processes the select digitized data to detect if a signal is present.

DETAILED DESCRIPTION

The following description is presented to enable embodiments in accordance with the invention to be made and used, and is provided in the context of a patent application and its requirements. Various modifications to the disclosed embodiments will be readily apparent and the generic principles herein may be applied to other embodiments. Thus, the invention is not intended to be limited to the embodiments shown, but is to be accorded the widest scope consistent with the appended claims and with the principles and features described herein.

Figure 1:
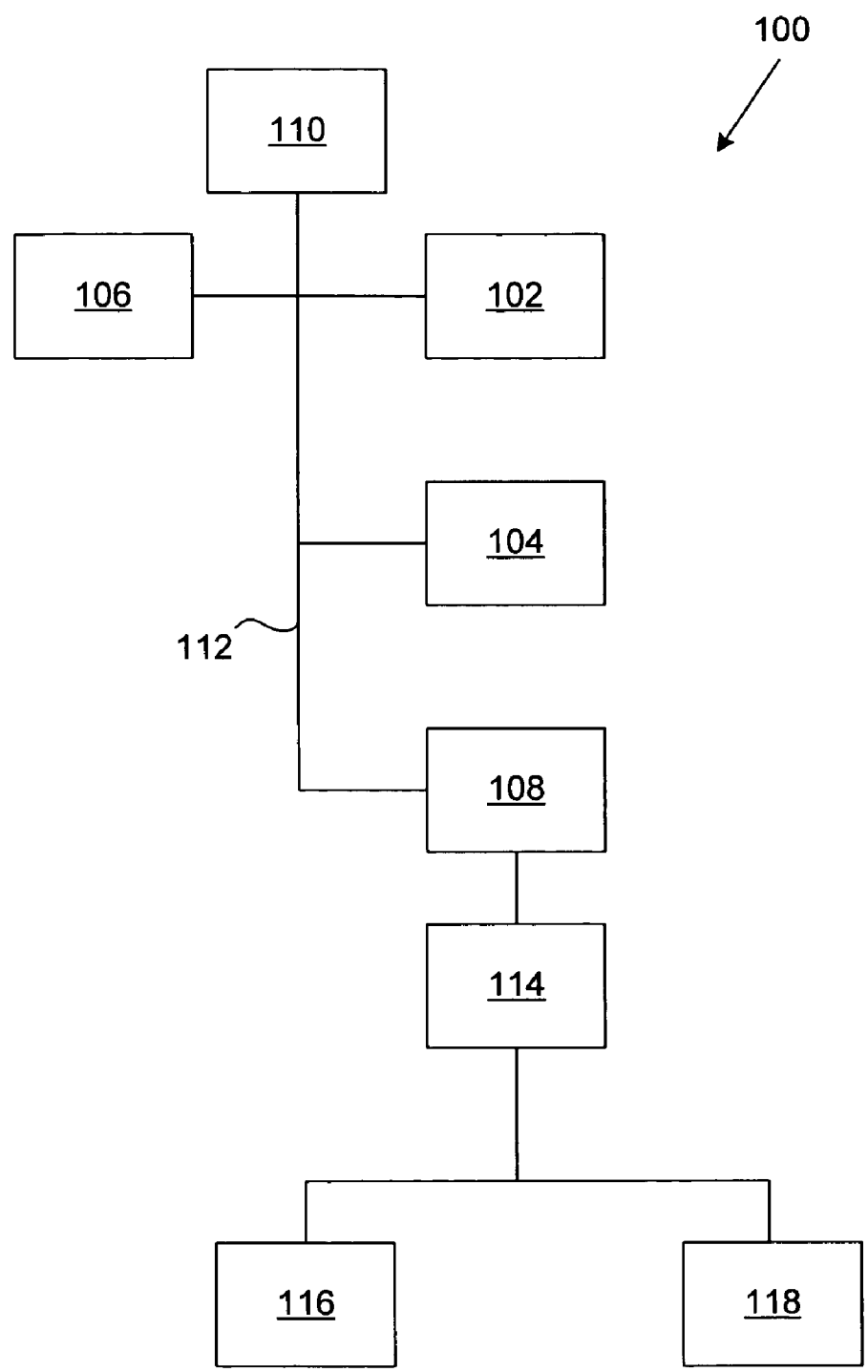
FIG. 1 is a diagrammatic illustration of a network of RF receivers in an embodiment in accordance with the invention.

With reference to the figures and in particular with reference to FIG. 1, there is shown a diagrammatic illustration of a network of RF receivers in an embodiment in accordance with the invention. Networks of RF receivers are arranged in any topology in other embodiments in accordance with the invention. Network 100 includes RF receivers 102, 104, central processing device 106, and router 108 connected to common network clock 110 through network connection 112. Central processing device 106 controls RF receivers 102, 104 and is implemented as a discrete processing device, such as a computer, in an embodiment in accordance with the invention.

Network connection 112 is implemented as a wired connection in an embodiment in accordance with the invention. For example, network 100 is a wired local area network (LAN) in an embodiment in accordance with the invention. In other embodiments in accordance with the invention, network connection 112 is implemented as a wireless connection, such as a wireless local area network (WLAN), or as a combination of both wired and wireless connections.

Repeater 114 is connected to router 108 and RF receivers 116, 118. Each RF receiver 102, 104, 116, 118 may be implemented as a discrete component or integrated within another device. RF receivers 102, 104, 116, 118 use network 100 for data transmission and processing in an embodiment in accordance with the invention. For example, RF receiver 102 may transmit or receive data from RF receiver 118 in network 100. RF receivers 102, 104, 116, 118 transmit data to central processing device 106 for data processing and analysis. Central processing device 106 is implemented within a receiver in network 100 in an embodiment in accordance with the invention. In other embodiments in accordance with the invention, two or more receivers are used to process data with the processing distributed among the receivers.

Central processing device 106 and RF receivers 102, 104, 116, 118 also transmit and receive timing information that is used to synchronize RF receivers 102, 104, 116, 118 to a common time defined by common network clock 110. Common network clock 110 is housed within central processing device 106 or integrated within an RF receiver in network 100 in an embodiment in accordance with the invention. In other embodiments in accordance with the invention, other types of devices or systems may be used for the common network clock, including, but not limited to, global positioning systems (GPS), high stability internal clocks such as atomic clocks, or any other clock with long-term stability compatible with the application.

Network 100 uses the Institute of Electrical and Electronic Engineers (IEEE) 1588 Standard to synchronize RF receivers 102, 104, 116, 118 in an embodiment in accordance with the invention. Other embodiments in accordance with the invention may implement different time synchronizing protocols. Moreover, the network devices that add delay, such as, for example, a switch, router, and repeater, may need symmetrical transmission and reception delays in other embodiments in accordance with the invention. In some of these embodiments, the delays may be compensated for in the RF system calibrations when the mean of the asymmetrical delays is stationary over a time interval.

The required accuracy in synchronizing RF receivers 102, 104, 116, 118 depends on the application. Precise timing accuracy is required in some applications, such as in geolocation applications. For signal detection, the timing accuracy is determined by the amount of memory in each device and the network latency. Standard networking timing protocols, such as NTP, provide sufficient timing accuracy in an embodiment in accordance with the invention.

Figure 2:
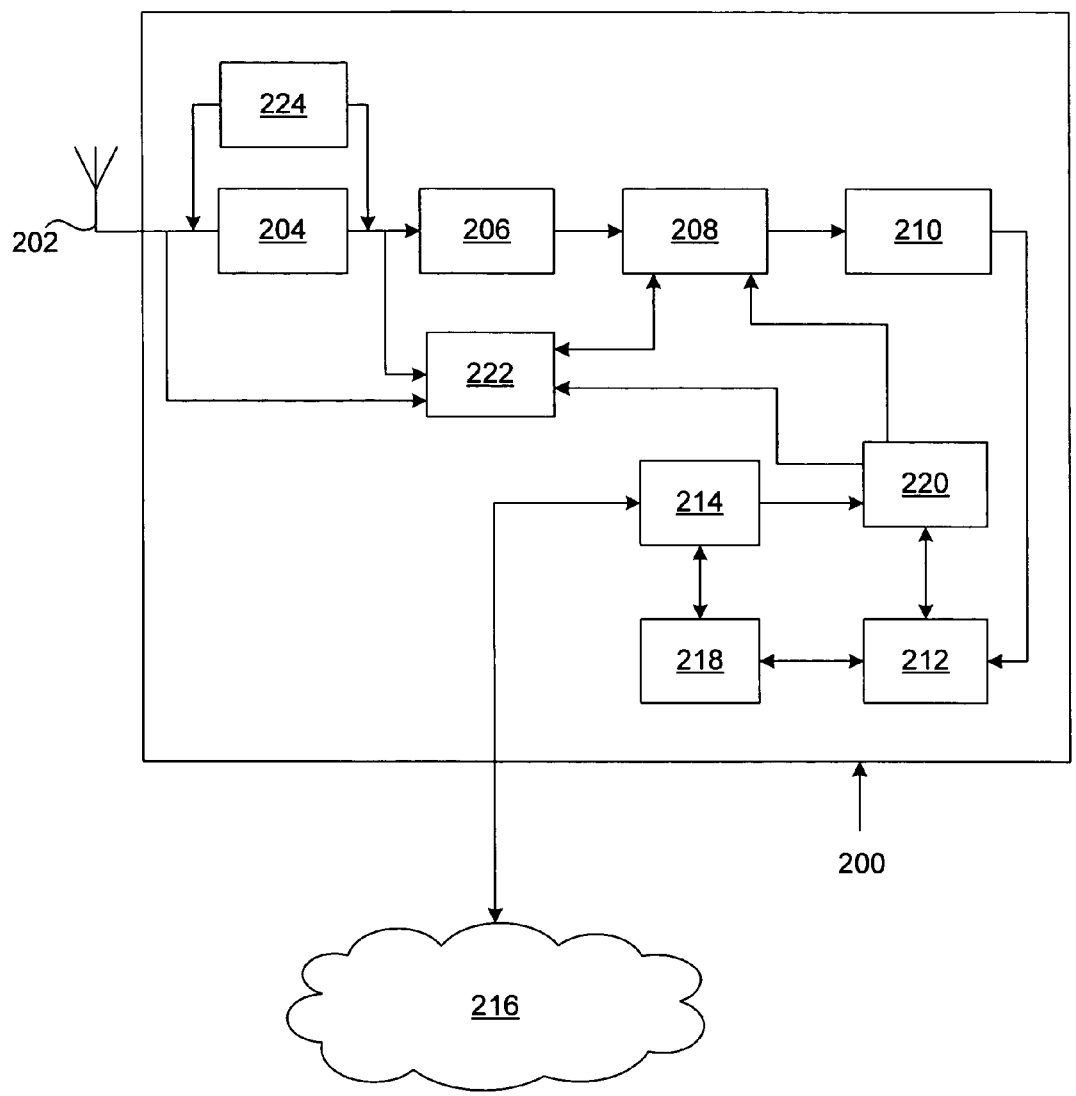
FIG. 2 is a block diagram of an RF receiver in an embodiment in accordance with the invention.

FIG. 2 is a block diagram of an RF receiver in an embodiment in accordance with the invention. RF receiver 200 includes antenna 202 that receives RF data or signals. Although only one antenna is shown in FIG. 2, RF receiver 200 may include multiple antennas in other embodiments in accordance with the invention.

Downconverter 204 receives RF data from antenna 202 and converts the RF data to a particular frequency spectrum. The RF data are then transmitted to digitizer 206, which converts the analog RF data to digital data. The digitized data are input into digital intermediate frequency (IF) 208. Digital IF 208 is a variable digital IF in an embodiment in accordance with the invention that variably limits the signal bandwidth and sample rate. Digital IF 208 also provides additional spectral isolation and enhancement of the receiver frequency and time-stamps the RF data that is subsequently stored in memory 210.

Downconverter 204 has a bandwidth that is equal to or greater than the bandwidth of digital IF 208 in an embodiment in accordance with the invention. Downconverter 204 has narrower bandwidths, fixed or selectable, that limit the bandwidth to improve performance by eliminating or reducing the levels of unwanted adjacent signals in other embodiments in accordance with the invention. As the bandwidth of digital IF 208 is adjusted to match the signal to be detected, the output sample rate of digital IF 208 is also adjusted to a rate that is sufficient to preserve information while at the same time maximizing memory utilization. Beyond a certain sample rate, no additional information is retained, memory is wasted, and signals can be observed for less time. The combination of downconverter 204 and digital IF 208 provide the flexibility to deal with a wide variety of signal types. When dealing with a fixed set of known signal formats, downconverter 204 and digital IF 208 may provide less flexibility in other embodiments in accordance with the invention.

The time interval between samples at the output of digital IF 208 may be longer than the accuracy required for a given application. For example, a signal with a 1 kHz bandwidth can be perfectly represented by complex samples (real and imaginary, or I and Q), taken at a 1 kHz rate or at 1 millisecond intervals. For geolocation, the accuracy required may be 50 nanoseconds or better. The data output from digital IF 208 and input into memory 210 is time-stamped with sufficient precision and accuracy for the application, independent of the sample rate going into, or coming out of digital IF 208. In another embodiment in accordance with the invention, a time is associated with a portion of the samples. For example, a time is associated with only one sample when the samples are evenly spaced and the sample rate is known.

Although only one receiver is shown in FIG. 2, RF receiver 200 may include multiple receiver channels in other embodiments in accordance with the invention. Data from the multiple receiver channels may be combined in receiver 200 before it is transmitted to the central processing device. For example, data from the multiple receiver channels are combined to perform beam steering in an embodiment in accordance with the invention. Alternatively, data from the receiver channels are not combined but transmitted to the central processing device for processing in another embodiment in accordance with the invention.

Digital signal processor 212 reads the buffered data from memory 210 and processes the digital data. Examples of data processing that may be performed by digital signal processor 212 include, but are not limited to, signal compression, demodulation, feature extraction, and data reduction. Network controller 214 transmits the data to another device in network 216. The other device may be another RF receiver or a central processing device. Device controller 218 formats the data for transmission over a network, initiates or regulates data acquisition and transfer, and provides other controller functions.

Network controller 214 also receives timing information from network 216 that is used to synchronize receiver clock 219 in time controller 220 to a common time in an embodiment in accordance with the invention. The common time is defined by a common network clock (e.g., 110 in FIG. 1). In other embodiments in accordance with the invention, time controller 220 acts as a common network clock and network controller 214 transmits timing information to the other RF devices in network 216 to synchronize the RF receivers to the common time as defined by receiver clock 219.

Time controller 220 distributes timing information to the other components in RF receiver 200. Time controller 220 provides data to digital IF 208 to allow digital IF 208 to time-stamp data or events with a time of day. Time controller 220 may also provide accurate timing information to digitizer 206 and serves as a frequency reference for downconverter 204, which improves the quality of the signal and provides long term timing stability. Time controller 220 may also improve short term timing stability by using high-quality oscillators in an embodiment in accordance with the invention. In another embodiment in accordance with the invention, time controller 220 serves as a temporary timing service when the network timing services are degraded or unavailable. In another embodiment in accordance with the invention, time controller receives timing information from other types of devices or systems, such as, for example GPS.

And in yet another embodiment in accordance with the invention, time controller 220 provides data to allow digital IF 208 to time-stamp data or events with a time of day and provides a frequency reference to digitizer 208. In this embodiment, the samples from one RF receiver (e.g., receiver 102) have no particular alignment with the samples from another RF receiver (e.g., receiver 104). This random phasing of the sample clocks is compensated for in the signal processing algorithms in central processing device 106. This is done in the time domain, for example, by noting the differences in the time-stamps and resampling the signal from one receiver so that the samples are time-aligned with the samples from the other receiver. Other methods may also be used, depending on the processing. For example, the cross-spectrum between the two signals may be computed and multiplied by a phase ramp, the slope of which corresponds to the time-stamp difference.

Trigger circuit 222 triggers action or the cessation of action within RF receiver 200. By way of example only, trigger circuit 222 can trigger data acquisition or the cessation of data acquisition within RF receiver 200. Memory 210 may therefore contain all samples leading up to the trigger event, all samples occurring after the trigger event, or combination of samples from before and after the trigger event. Trigger circuit 222 is implemented as a time of day trigger in an embodiment in accordance with the invention. Trigger circuit 222 receives time of day information from time controller 220.

In another embodiment in accordance with the invention, trigger circuit 222 is implemented as an event trigger that triggers when a trigger criterion, or criteria, is met. For example, in one embodiment in accordance with the invention, trigger circuit 222 triggers when an amplitude or frequency of the RF data received from antenna 202 meets or exceeds a predetermined value, or when a trigger message is received. In another embodiment in accordance with the invention, characteristics of the RF data output from downconverter 204 or RF data in digital IF 208 can trigger circuit 222. And in yet another embodiment in accordance with the invention, the trigger criterion or criteria may be an event or input that originates outside of receiver 200, such as, for example, a trigger input, lighting detector, or door alarm.

Calibration circuit 224 is used to characterize the signal paths in RF receiver 200. For example, calibration circuit 224 injects signals into either the RF signal received from antenna 202 or the IF signal output from downconverter 204 to compensate for group delay and amplitude errors.

Figure 3:
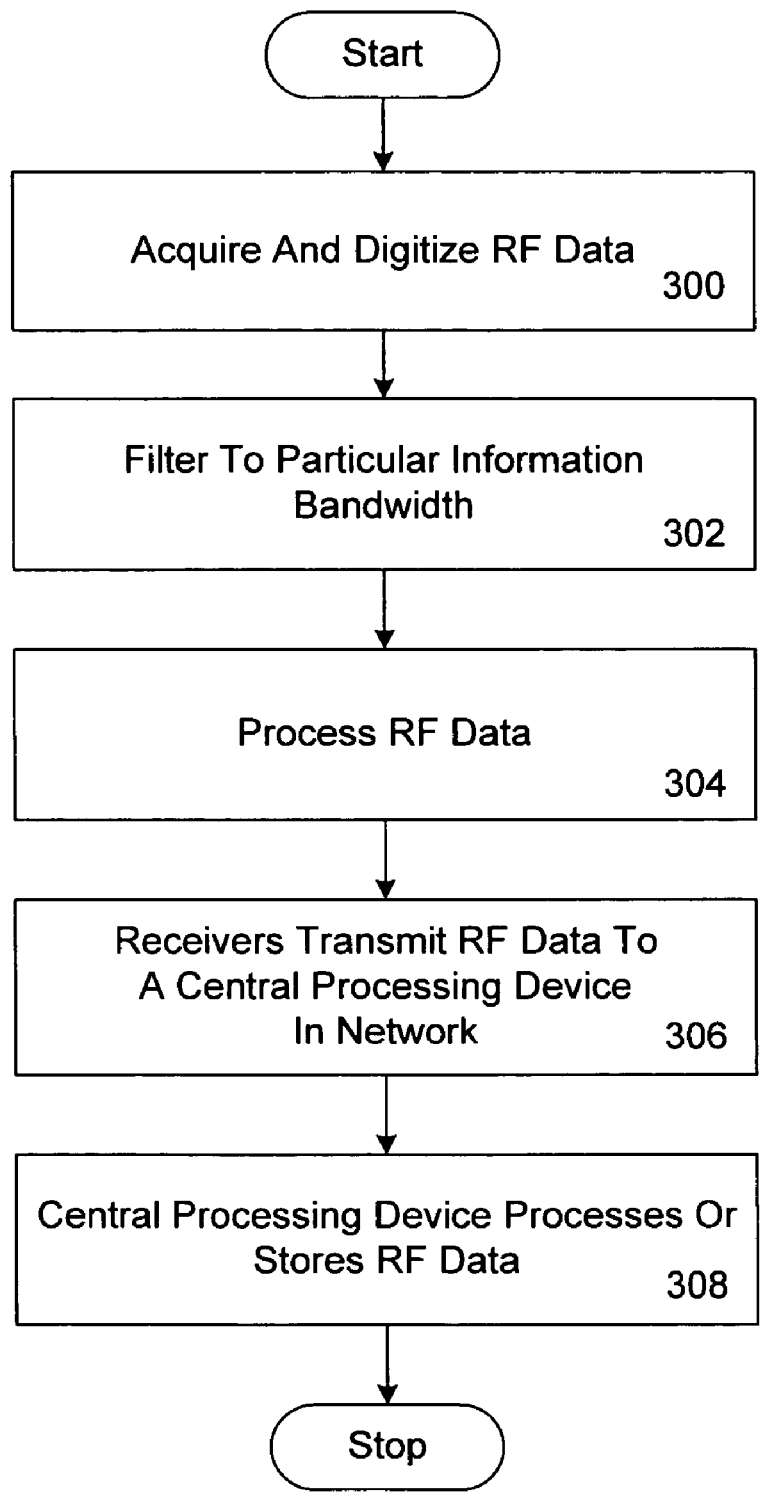
FIG. 3 is a flowchart of a first method for detecting an RF signal using a network of RF receivers in an embodiment in accordance with the invention.

Referring now to FIG. 3, there is shown a flowchart of a first method for detecting an RF signal using a network of RF receivers in an embodiment in accordance with the invention. The method is described in conjunction with a single RF receiver. With a network of RF receivers, the method shown in FIG. 3 is performed by some or all of the receivers in the network.

The method of FIG. 3 detects a continuous or near continuous RF signal in an embodiment in accordance with the invention. Initially RF receivers acquire and digitize RF data, as shown in block 300. The digitized RF data are then filtered to a particular information bandwidth at block 302. Filtering of the RF data is performed by a variable digital IF (e.g., 208 in FIG. 2) in an embodiment in accordance with the invention.

The receiver then processes the RF data, as shown in block 304. For example, the receiver may compress the signal or extract features from the signal in an embodiment in accordance with the invention. The RF receiver then transmits the processed RF data to a central processing device, as shown in block 306. The central processing device processes or stores the RF data, as shown in block 308. In one embodiment in accordance with the invention, the central processing device processes the data in order to detect an RF signal. Techniques for detecting an RF signal using RF data received from two or more receivers in a network are described in more detail in conjunction with FIGS. 6-7.

Other embodiments in accordance with the invention may arrange the blocks shown in FIG. 3 in a different order, omit some of the blocks, or add new blocks. By way of example only, block 302, block 304, or both blocks 302 and 304 may be omitted in other embodiments in accordance with the invention.

Figure 4:
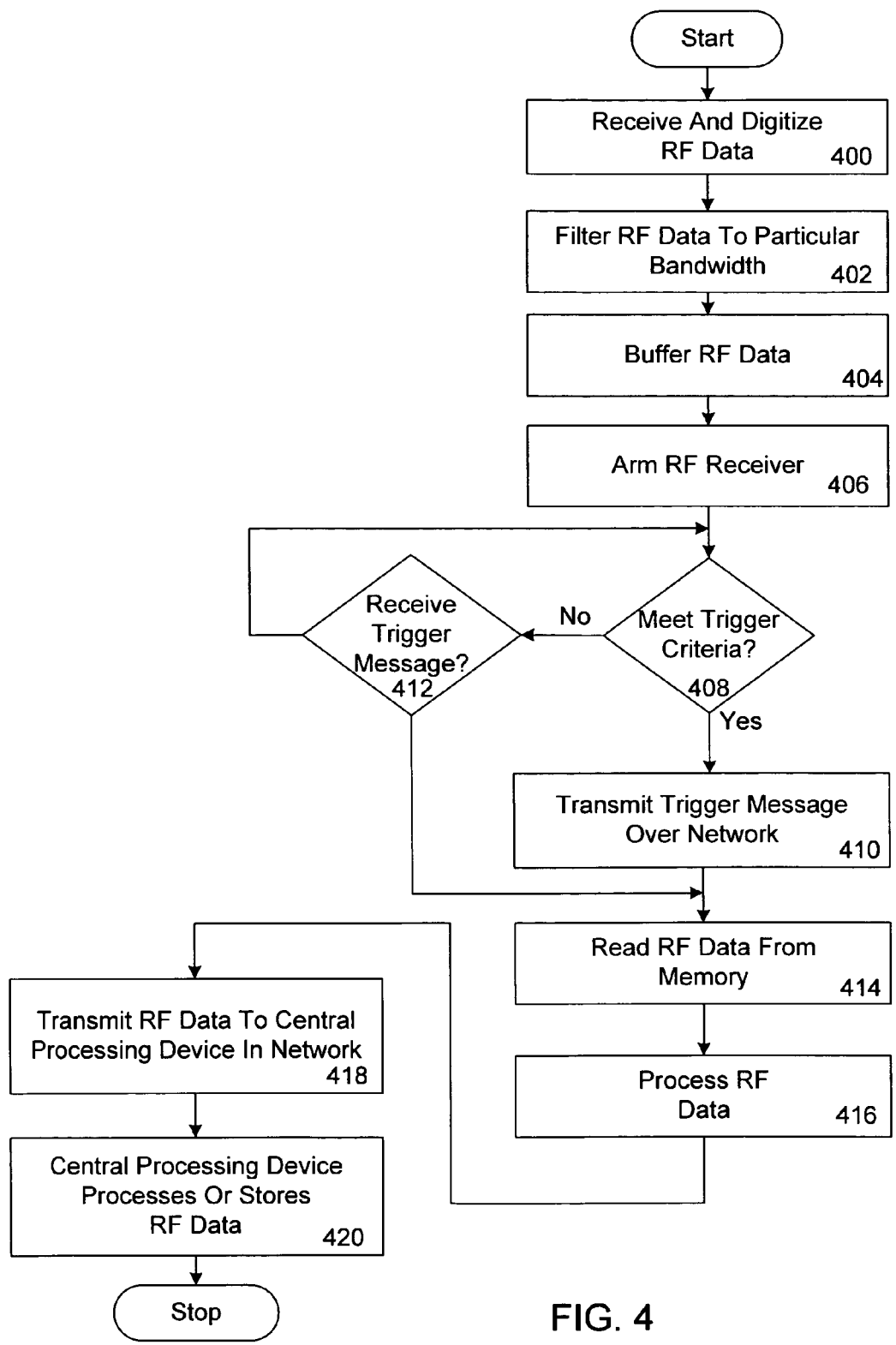
FIG. 4 is a flowchart of a second method for detecting an RF signal using a network of RF receivers in an embodiment in accordance with the invention.

FIG. 4 is a flowchart of a second method for detecting an RF signal using a network of RF receivers in an embodiment in accordance with the invention. The method shown in FIG. 4 is described with reference to a single RF receiver in a network of RF receivers. In practice, some or all of the receivers in the network perform the method shown in FIG. 4 in an embodiment in accordance with the invention.

Initially an RF receiver receives and digitizes RF data (block 400), filters the RF data to a particular bandwidth (block 402), and buffers the data in a memory (block 404). A trigger circuit in the RF receiver is then armed or enabled at block 406, which readies the trigger circuit to respond to one or more trigger criteria. A central processing device in the network transmits a message to each receiver that arms or enables the trigger circuit in an embodiment in accordance with the invention. For example, the message may include the trigger criterion or criteria. The trigger criterion or criteria may be pre-programmed in each receiver in other embodiments in accordance with the invention.

The trigger criterion or criteria are determined by the application. For example, the trigger criterion may be a time of day in an embodiment in accordance with the invention. This type of trigger may be used, for example, when the signals are expected to be present at the trigger time. In another embodiment in accordance with the invention, the trigger criterion is an event or characteristic of the RF data, such as, for example, a signal amplitude or frequency of an RF or IF signal. For example, the amplitude triggering technique may be appropriate for detecting burst or intermittent signals. In this example, the trigger circuit may be armed at a specific time of day, to allow multiple receivers on the network to trigger on the same event.

Next, at block 408, the trigger circuit determines whether the trigger criterion or criteria have been met. If the trigger criteria have been met, the receiver transmits a trigger message that includes a time-stamp over the network (block 410). The time-stamp indicates the time of day when the trigger criterion or criteria was met. In one embodiment in accordance with the invention, the trigger message is a broadcast message that is sent to all of the other receivers in the network. In another embodiment in accordance with the invention, the trigger message is a point-to-point message sent to specific receivers in the network.

If the trigger criterion or criteria are not met at block 408, the process passes to block 412 where a determination is made as to whether the receiver received a trigger message from another receiver in the network. Another receiver in the network may transmit a trigger message when the other receiver determines a trigger criterion is met. The trigger message includes a time-stamp of when the receiver detected the trigger criterion. The receiver that receives the trigger message will respond even though the signal was too weak for the receiver to detect, or the signal failed to meet the trigger criterion at the receiver, as may occur when the signal power is low, or the RF receivers are far apart.

When a trigger message is not received at block 412, the process returns to block 408. If a trigger message has been received, or if the receiver has transmitted a trigger message over the network at block 410, the method continues at block 414 where the receiver reads the appropriate RF data from memory. The receiver uses the time-stamp to determine which RF data is the appropriate RF data. And since all of the RF receivers in the network are synchronized to a common network time in an embodiment in accordance with the invention, all of the RF receivers are able to determine which RF data in memory is the appropriate RF data to read out of memory.

Next, at block 416, the receiver processes the RF data. Processing of the RF data may include, for example, signal compression, demodulation, or feature extraction in an embodiment in accordance with the invention. The RF receiver then transmits the RF data to a central processing device (block 418) and the central processing device processes or stores the RF data (block 420). The central processing device processes the RF data in order to detect an RF signal in an embodiment in accordance with the invention. Techniques for detecting an RF signal are described in more detail in conjunction with FIGS. 6-7.

Other embodiments in accordance with the invention may arrange the blocks shown in FIG. 4 in a different order, omit some of the blocks, or add new blocks. By way of example only, block 402, block 416, or both blocks 402 and 416 may be omitted in other embodiments in accordance with the invention.

Figure 5:
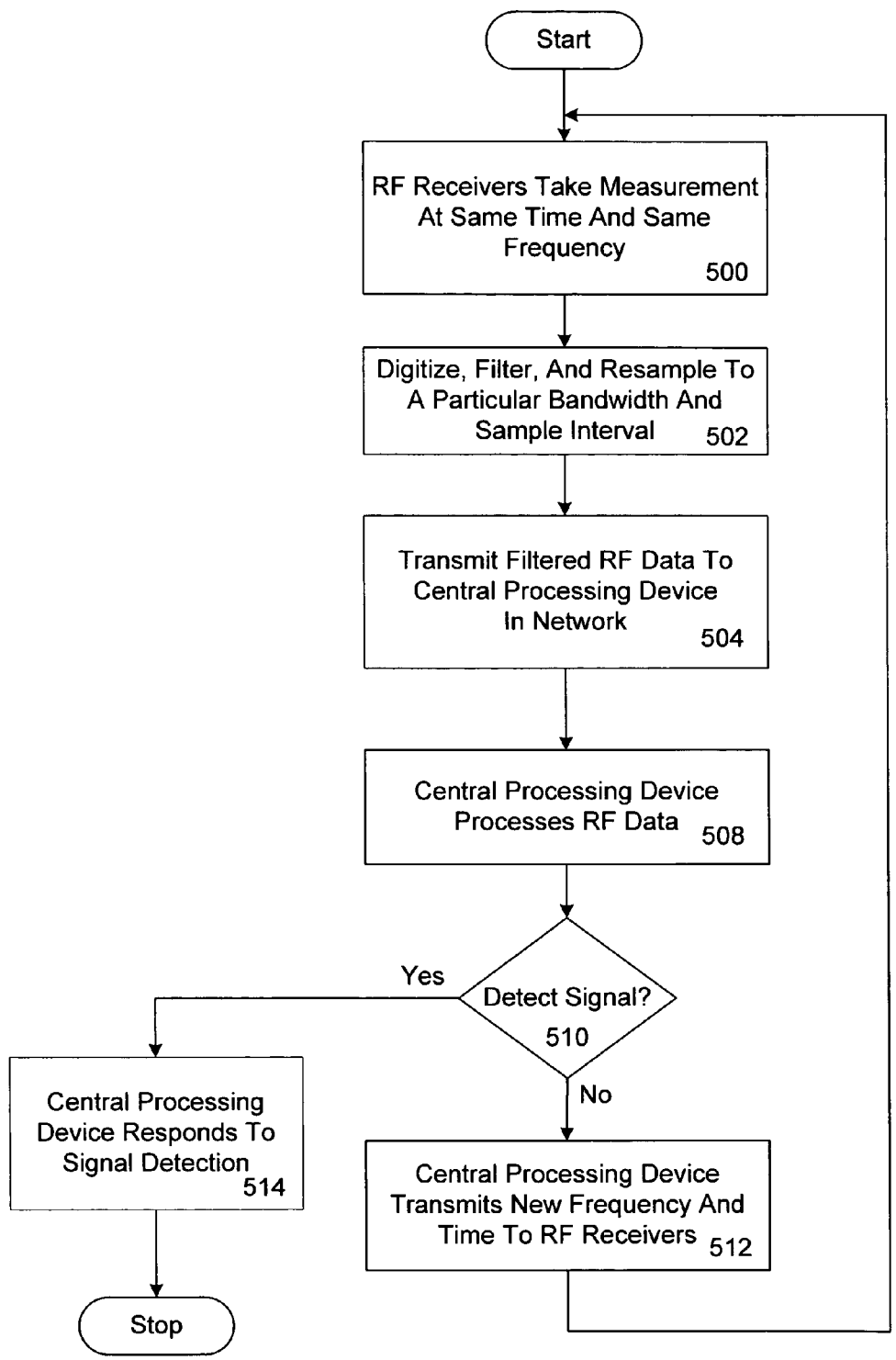
FIG. 5 is a flowchart of a third method for detecting an RF signal using a network of RF receivers in an embodiment in accordance with the invention.

Referring to FIG. 5, there is shown a flowchart of a third method for detecting an RF signal using a network of RF receivers in an embodiment in accordance with the invention. This method may be used, for example, when searching for unknown signals. Initially some or all of the receivers in a network measure or sample the RF data on a particular frequency over approximately the same time interval (block 500). The RF receivers are able to take a measurement at the same time because the receivers in the network are synchronized to a common network time in an embodiment in accordance with the invention. The receivers then digitize, filter, and resample the RF data to a particular bandwidth and sample interval, as shown in block 502.

Next, at block 504, the receivers transmit the sampled RF data to a central processing device in the network. When the samples from one receiver do not align perfectly with the samples from another receiver in the network, an ensemble of samples from one receiver that overlap in time with an ensemble of samples from the other receiver are transmitted to the central processing device in an embodiment in accordance with the invention. The central processing device then processes the RF data (block 508) and determines whether an RF signal has been detected (block 510). Techniques for detecting an RF signal using RF data from two or more receivers in a network are described in more detail in conjunction with FIGS. 6-7.

If an RF signal is not detected, the central processing device transmits a message to the RF receivers at block 512 that establishes a new time and frequency to take the next measurement. The process then returns to block 500 and repeats until a signal is detected at block 510. When a signal is detected at block 510, the central processing device responds to the detection of a signal by taking further action in an embodiment in accordance with the invention (block 514). For example, the central processing device may process the signal for an application, such as for geolocation. Alternatively, the central processing device may log the signal and its detection and then resume searching.

Other embodiments in accordance with the invention may arrange the blocks shown in FIG. 5 in a different order, omit some of the blocks, or add new blocks. By way of example only, block 502 may digitize the RF data but not filter to a particular bandwidth in another embodiment in accordance with the invention. Rather than detecting a signal at block 510, block 510 may determine whether an event has occurred. For example, block 510 may determine whether the frequency of the RF data has shifted or whether the amplitude has met or exceeded a predetermined value.

Figure 6:
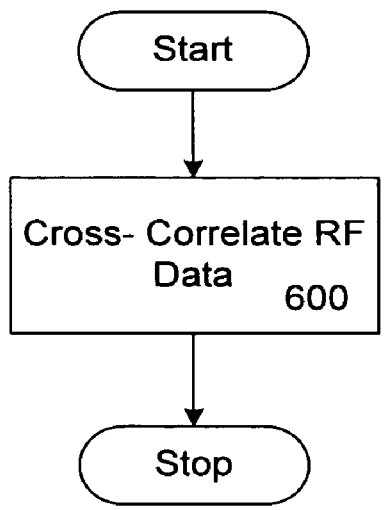
FIG. 6 is a flowchart of a first method for processing RF data as shown in block 308 in FIG. 3, block 420 in FIG. 4, and block 508 in FIG. 5.

FIG. 6 is a flowchart of a first method for processing RF data as shown in block 308 in FIG. 3, block 420 in FIG. 4, and block 508 in FIG. 5. The central processing device receives RF data from two or more receivers and correlates pairs of data, as shown in block 600. The central processing device uses the cross-correlation of the RF data received from some or all of the receivers in the network to determine if a signal is present. If a signal is moving, or one or more of the RF receivers have a frequency error, it may be necessary to correct for the frequency shift between data from receivers before, or as part of the cross-correlation computation. In addition to indicating the presence of a signal, the presence of a correlation peak or the placement and shape of the correlation peak can be used to help identify the type of signal, as well as the time difference of arrival between receiver pairings. The time difference of arrival information may then be used to determine the location of an RF emitter.

Figure 7:
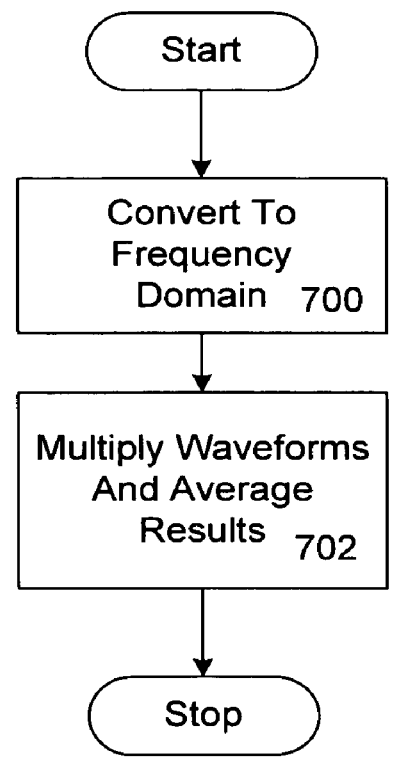
FIG. 7 is a flowchart of a second method for processing RF data as shown in block 308 in FIG. 3, block 420 in FIG. 4, and block 508 in FIG. 5.

Referring to FIG. 7, there is shown a second method for processing RF data as shown in block 308 in FIG. 3, block 420 in FIG. 4, and block 508 in FIG. 5. Initially the central processing device receives RF data from one or more pairs of receivers and converts the data from the time domain to the frequency domain, as shown in block 700. This may be done, for example, using a fast Fourier Transform (FFT). The data values received from the first receiver are then multiplied together on a value by value basis by the complex conjugate of the data from the second receiver and the results coherently averaged (block 702). This information may then be used to detect an RF signal emitter and observe its spectral characteristics. The cross-spectrum phase is adjusted, as necessary, before averaging in order to compensate for phase drift between receivers caused by phase drift in the local oscillators in the receivers, or by changes in propagation characteristics. The cross-spectrum phase may also be adjusted to compensate for time-offsets between samples as determined from the time-stamps.

The invention claimed is:

1. A method for detecting an RF signal in a network of RF receivers, wherein the network of RF receivers comprises a plurality of RF receivers connected to a central processing device, the method comprising:
   receiving the RF signal by a first RF receiver among the plurality of RF receivers;
   at the first RF receiver:
      producing first digitized data from the received RF signal,
      time-stamping the first digitized data to produce first time-stamped data,
      storing the first time-stamped data in a memory in the first RF receiver,
      detecting whether a trigger criterion is satisfied based on a characteristic of the received RF signal, and in response thereto:
         retrieving the first time-stamped data from the memory,
         processing the retrieved first time-stamped data,
         transmitting the processed first time-stamped data over the network, and
         transmitting from the first RF receiver to a second RF receiver in the network a trigger message that includes a time-stamp identifying a time when the first RF receiver detected that the trigger criterion was satisfied;
   at the second RF receiver:
      producing second digitized data from the RF signal received by the second RF receiver,
      time-stamping the second digitized data to produce second time-stamped data,
      storing the second time-stamped data in a memory in the second RF receiver,
      detecting the trigger message transmitted by the first RF receiver, and in response thereto,
         retrieving the second time-stamped data from the memory in the second RF receiver,
         processing the retrieved second time-stamped data, and
         transmitting the processed second time-stamped data over the network;

noting a time-difference between the processed first time-stamped data from the first RF receiver, and the processed second time-stamped data from the second RF receiver;

computing a cross-spectrum between the processed first time-stamped data and the processed second time-stamped data; and multiplying the cross-spectrum with a phase ramp having a slope which corresponds to a difference in time stamps between the processed first time-stamped data and the processed second time-stamped data.

2. The method of claim 1, further comprising synchronizing the network of RF receivers to a common time.

3. The method of claim 1, further comprising combining and coherently processing the processed first time-stamped data transmitted from the first RF receiver, and the processed second time-stamped data transmitted from the second RF receiver, to detect the RF signal.

4. The method of claim 1, further comprising variably limiting a bandwidth of the first digitized data.

5. The method of claim 1, further comprising variably limiting a sample rate of the first digitized data.

6. The method of claim 1, further comprising synchronizing a timing controller in the first RF receiver to a common sense of time in the network according to an IEEE 1588 standard.

7. The method of claim 1, further comprising aligning in time the processed first time-stamped data from the first RF receiver, and the processed second time-stamped data from the second RF receiver.

* * * * *